US010797945B2

(12) United States Patent
Toews et al.

(10) Patent No.: US 10,797,945 B2
(45) Date of Patent: Oct. 6, 2020

(54) METHODS ARE PROVIDED FOR FLIGHT MANAGEMENT SERVICES IN A CLOUD ENVIRONMENT

(71) Applicant: HONEYWELL INTERNATIONAL INC., Morris Plains, NJ (US)

(72) Inventors: Phillip Toews, Phoenix, AZ (US); Rajeev Mohan, Karnataka (IN); Ravish Udupa, Karnataka (IN); Richard Snyder, Phoenix, AZ (US); Robert Brownlee, Phoenix, AZ (US); Brian Walter, Phoenix, AZ (US); Daniel E. Lewis, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 170 days.

(21) Appl. No.: 15/884,835

(22) Filed: Jan. 31, 2018

(65) Prior Publication Data
US 2019/0149404 A1 May 16, 2019

(30) Foreign Application Priority Data
Nov. 10, 2017 (IN) .............................. 201711040268

(51) Int. Cl.
G06F 15/177 (2006.01)
H04L 12/24 (2006.01)
(Continued)

(52) U.S. Cl.
CPC .......... H04L 41/0806 (2013.01); G06F 15/00 (2013.01); G08G 5/003 (2013.01);
(Continued)

(58) Field of Classification Search
CPC .. G08G 5/0021; G08G 5/0039; G08G 5/0013; G08G 5/0034; G08G 5/003;
(Continued)

(56) References Cited

U.S. PATENT DOCUMENTS 7,437,225 B1   10/2008 Rathinam
8,755,992 B2   6/2014  Baker et al.
(Continued)

OTHER PUBLICATIONS

European Patent Office, European Extended Search Report for Application No. 18205501.2 dated Apr. 3, 2019.

Primary Examiner — Oleg Survillo
(74) Attorney, Agent, or Firm — Lorenz & Kopf, LLP

(57) ABSTRACT

Methods for providing a flight management service in a cloud computing environment, the method includes: receiving, an object request by a server from a mobile device wherein the server is located in the cloud computing environment including: at least a flight management system (FMS) connected to a stateless object; processing, by the connected FMS hosted by the server, the object request generating a resource object for a particular flight plan wherein the resource object includes a data set; storing, by the connected FMS, the data set at the stateless object in the cloud environment; and sending, by the server, an object response from the connected FMS to the mobile device, for accessing the data set of the stateless object for the particular flight plan.

13 Claims, 10 Drawing Sheets

(51) Int. Cl.
*H04L 29/08* (2006.01)
*G08G 5/00* (2006.01)
*G06F 15/00* (2006.01)
*H04L 29/06* (2006.01)

(52) U.S. Cl.
CPC ......... *G08G 5/0026* (2013.01); *G08G 5/0034* (2013.01); *H04L 67/1097* (2013.01); *H04L 67/12* (2013.01); *H04L 67/42* (2013.01)

(58) Field of Classification Search
CPC ........ G08G 5/0078; G08G 5/025; G08G 5/00; G08G 5/0026; G08G 5/0047; G08G 5/0052; G08G 5/0056; G08G 5/065; G08G 5/006; G08G 5/0069; G08G 5/0082; G08G 5/0091; G06F 15/00; H04L 41/0806; H04L 67/12; H04L 67/42; H04L 67/1097
See application file for complete search history.

(56) References Cited

U.S. PATENT DOCUMENTS

| | | |
|---|---|---|
| 9,443,434 B2 | 9/2016 | Hale et al. |
| 2009/0319100 A1* | 12/2009 | Kale .................... G08G 5/0013 701/4 |
| 2012/0215505 A1 | 8/2012 | Srivastav et al. |
| 2012/0265372 A1 | 10/2012 | Hedrick |
| 2014/0282038 A1 | 9/2014 | Royster et al. |
| 2016/0065497 A1 | 3/2016 | Coulmeau et al. |
| 2016/0111007 A1 | 4/2016 | Dennerline |
| 2017/0067751 A1 | 3/2017 | Apley |

* cited by examiner

METHODS ARE PROVIDED FOR FLIGHT MANAGEMENT SERVICES IN A CLOUD ENVIRONMENT

CROSS REFERENCE TO RELATED APPLICATIONS

This application claims priority to Indian Provisional Patent Application No. 201711040268, titled "METHODS ARE PROVIDED FOR FLIGHT MANAGEMENT SERVICES IN A CLOUD ENVIRONMENT" that was filed on 10 Nov. 2017.

TECHNICAL FIELD

The present invention generally relates to cloud based services of Flight Management Systems (FMS) and more particularly to a methods for managing cloud based services and providing cloud connectivity for flight management systems using object data formats for generating and storing objects of data sets for FMS applications.

BACKGROUND

Cloud computing is the use of resources that are delivered as a service over a network, typically the Internet. Cloud based applications are enabling aviation connectivity solution executed by intelligent server based applications that allow for more efficient management of aircraft operations and efficiency by the pilot and ground personnel. In addition, these intelligent server based applications coupled to data analytical engines provide reporting tools for aircraft operational data and for modeling and processing goals, alerts and cost reduction during the aircraft operations.

JSON (JavaScript Object Notation) is a lightweight data-interchange format. It is based on a subset of the JavaScript Programming language. Web-based applications can exchange and/or store information in JSON format. Customized indexing and searching JSON data in data sets for these applications can be applicable for use in complex control systems such as the FMS in aircrafts for managing the data used in flight operations.

Onboard communication systems on an aircraft are equipped with transmitters and receivers that allow for the convenient connectivity and transmission of changes and updates to Flight Management Systems (FMS) on aboard the aircraft from cloud based servers and remote clients.

Current FMS operate on an embedded model where limited accessibly, connectivity and modeling are provided as well as the inability to store data sets for static moments of flight operation for particular modes of the FMS. In addition, current systems fail to provide distributed computing modes of accessibly; the ability of multiple personnel including pilots and ground personnel to enter data for modeling flight operations in a FMS. Also, current systems fail to provide convenient storing and updating of data sets and remote entry of data sets prior to flight operations of an aircraft. Finally, current systems fail to provide a platform independent FMS system capable of receiving data sets of multiple aircraft types and configurable by linked libraries and historical data.

Hence, it is desirable to address these inadequacies raised in flight management systems that occur with the pilot and the ground controllers with a cloud based service that provides methods and systems using customized objects to improve aviation systems connectivity, analytics and distributed computing functionality and that allows for entry of data from disparate independent systems such as mobile devices and server systems to improve efficiency of avionic operations and control systems. The present disclosure addresses at least this need.

BRIEF SUMMARY

Methods and systems are provided for a flight management service in a cloud computing environment that enables the creating, sharing, and updating of data sets for use by a flight management system in the computing environment and an embedded flight management system.

In an exemplary embodiment, a method for providing a flight management service in a cloud computing environment is provided, the method includes: receiving, an object request by a server from a mobile device wherein the server is located in the cloud computing environment including: at least a flight management system (FMS) connected to a stateless object; processing, by the connected FMS hosted by the server, the object request generating a resource object for a particular flight plan wherein the resource object includes: a data set; storing, by the connected FMS, the data set at the stateless object in the cloud environment; and sending, by the server, an object response from the connected FMS to the mobile device, for accessing the data set of the stateless object for the particular flight plan.

In another exemplary embodiment, a computer program product for a cloud-computing environment is provided and includes a plurality of cloud-computing resources, the product includes a computer-readable storage medium in which program instructions are stored, the program instructions are configured to cause a flight management computer to perform the operations of: receiving, an object request by a server from a mobile device wherein the server is located in the cloud computing environment which includes: at least a flight management system (FMS) connected to a stateless object; processing, by the connected FMS hosted by the server, the object request generating a resource object for a particular flight plan wherein the resource object includes: a data set; storing, by the connected FMS, the data set at the stateless object in the cloud environment; and sending, by the server, an object response to the mobile device, for accessing from the connected FMS the data set of the stateless object for the particular flight plan.

In yet another exemplary embodiment, a non-transitory computer-readable medium storing a computer program product executable by a processor of a computer system in a cloud computing environment for processing an object request is provided, the non-transitory computer-readable medium includes: code for receiving, the object request by a server from a mobile device wherein the server is located in the cloud computing environment which includes: at least a flight management system (FMS) connected to a stateless object; code for processing, by the connected FMS hosted by the server, the object request generating a resource object for a particular flight plan wherein the resource object includes: a data set; code for storing, by the connected FMS, the data set at data storage in the cloud environment; and code for sending, by the server, an object response from the connected FMS to the mobile device, for accessing the data set of the stateless object for the particular flight plan.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
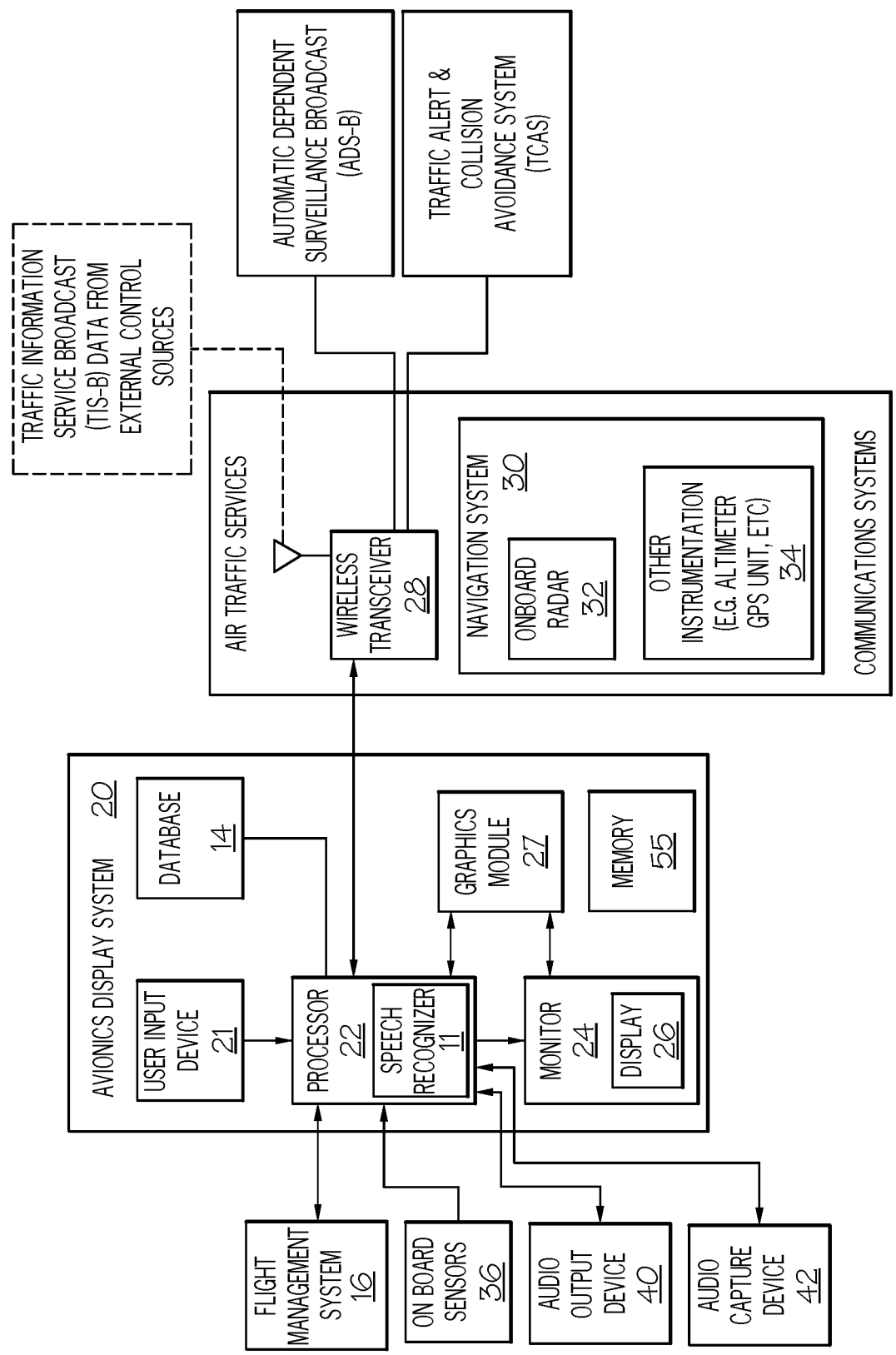
FIG. 1 is a block diagram of a system suitable for use in an aircraft in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

While the exemplary embodiments described herein refer to JSON JavaScript Object Notation (JSON) Application Programming Interfaces (API) used in methods and systems for communicating with flight management systems related to the aircraft operation, it is contemplated that other APIs may be used. For example, alternatives to APIs include but are not limited to gRPC, XML, and other WebAPIs.

The connected FMS will enable a variety of FMS features to be offered as a web based FMS service. In an exemplary embodiment, the FMS service may use an API or WebAPI for capturing a data set of a static mode of the FMS. The JSON API is a specification for how a client should request that resources be fetched or modified, and how a server should respond to those requests.

For example, this may be considered a RESTful (Representational State Transfer) API (Application Program Interface) which would enable the retention of data inputted by the user and associated with a particular request to the FMS. That is, the FMS does not retain such call or request data but by inputting the data using the protocol of the RESTful API, the connected FMS would provide a cloud repository for the data. When using an embedded FMS as opposed to a connected FMS, a client residing on a mobile device used with the embedded FMS would receive the data inputted by the user but would not be able to retain the data in memory nor be able to update the data at a later time. For example, if the user enters an initial flight plan via the client to the embedded FMS of the aircraft, the client associated with the embedded FMS is not able to send a flight plan to the connected FMS nor able at a later time to modify the initial flight plan with, for example, a cruise change in the flight plan without having to re-enter the entire set up information of the original flight plan. In other words, there is no state persistence of the FMS that can be saved or retained and the ability to recall prior previous entries.

In exemplary embodiment, the RESTful API enables the connected FMS to retain a data set without the need of the client having to re-send all the setup data with each modification to the flight plan. In addition, the connected FMS does not have to remain in an active mode during the flight operation but can be actuated from a sleep mode to an active mode when needed. By having the active and inactive modes processing bandwidth is limited as background processing of the data set is not required when using the connected FMS. This is because the connected FMS uses a data set which is captured of a particular instance or static state of the flight operation and not for ongoing flight operations. This proves particularly useful for a complex flight modification in the flight plan operation which may involve a large amount of setup data in the flight plan (e.g. data from many waypoints, constraints, and wind data).

The connected FMS relies on a database to capture embedded FMS internal data after each operation in the flight plan and provides a snapshot of a data set of a particular instance in the flight plan. This database of the data sets is stored at a cloud based server in remote communication with the client of connected FMS. In instances, a unique identifier is used to identify a particular client and the unique identifier enables other independent clients access to the data set to reuse or modify the associated flight plan without having to resend all the initial set-up information to reproduce the particular state of the embedded FMS in the flight operation. The connected FMS may also be used for the embedded FMS input to sync with the embedded FMS data set and to modify the flight plan, reposition the aircraft flight, or to restore a prior state in a state databases associated with the connected FMS.

In addition the data set may be synced to another FMS as part of a redundancy management feature. In an exemplary example, the connected FMS stored the data set in memory and the proceeds to securely transfer the data set via the client to another FMS with the FMS in operation so there is no loss of functionality as the data set is received or buffered, validated for determinations of integrity of the data set, and then executed by the receiving FMS.

This data save/restore capability is defined by the use of the database connected to the flight management service in the cloud environment. The service based FMS saves the "sync" data service into a database to respond to future requests, This data is then provided either as an unique new identifier source to a dataset provided (if required to be sent back to the client) or as the original data set. The client to access the dataset just provides the requested request with the unique ID to perform a FMS modification in operation and uses the previously stored dataset in the database (by providing the unique ID as part of the initial request). Alternatively, the client may just re-request the previously produced response with no changes to review the results of a previous request.

The Next Generation (NextGen) overhaul of the United States airspace system and the companion Single European Sky ATM Research (SESAR) overhaul of the European airspace system creates various trajectory-based mechanisms to improve air traffic management on these continents. That is, electronic instrumentation displays continue to advance in sophistication, achieving increasingly higher levels of information density and, consequently, presenting a greater amount of visual information to be perceived and understood by the operator, e.g., the pilot and adding to burdens incurred by the pilot. Aviation systems connectivity such as the connected FMS can lessen pilot workloads and counter the additional burdens placed on the pilot from the increases in automation.

In an exemplary example, electronic flight bag (EFB) solutions, which include electronic display systems for the flight deck or cabin crew member use, are gaining in popularity. For example, EFB devices can display a variety of aviation data or perform basic calculations (e.g., performance data, fuel calculations, takeoff and landing computations, etc.). In the past, some of these functions had to be manually entered using paper references or were based on data provided to the flight crew by an airline's flight dispatch function. Connected FMS may alleviate the need in some instance for inputting all the aviation data needed in these EFB solutions.

With other increased burdens placed on the pilot and crew in the aircraft operations, there may be a resultant increase in human errors due to a number of factors which include: non-coordinated cockpit system messages, poor external visibility, fatigue, lack of position awareness, misunderstood ATC clearances, multiple or conflicting ATC clearances, or inadvertent flight deck distractions leading to accidents. Cloud based applications such as the connected FMS and remote input of data for flight management modeling and use may be used to counter such affects. For example, data sets for flight management can be used in conjunction with avionic control systems for a host of applications to aid the pilot in flight operations with systems that include but are not limited to the cockpit display systems, Flight Management Systems, Enhanced Ground Proximity Warning System (EGPWS), Traffic Collision Avoidance System TCAS, Weather or RADAR Systems, EFB devices, etc.

Also, the pervasive use of personal electronic devices and complex systems such as the flight deck systems provides an opportunity for improving performance using interactive prediction models and cloud applications such as the connected FMS.

Certain terminologies are used with a regard to the various embodiments of the present disclosure. For example, a display unit is an aircraft onboard device that provides a user interface for a particular avionic system onboard an aircraft, which may include a Flight Management System (FMS), Communications Management Function (CMF), assigned spacing goal (ASG), achieve by point (ABP), automatic dependent surveillance broadcast (ADS-B), flight information services-broadcast (FIS-B) or other avionics systems. The flight crew members may use the FMS interface to perform tasks associated with flight planning, navigation, guidance, and performance. A processor may be coupled to the display unit to format communications of data transmissions originating from one or more avionics systems onboard an aircraft, and which are directed to a cockpit display onboard the aircraft.

FIG. 1 depicts a block diagram of an exemplary aircraft navigation and control system, in accordance with the disclosed embodiments. FIG. 1 is a functional block diagram of an avionics display system 20 in accordance with an exemplary embodiment. The avionics display system 20 includes at least one processor 22 and at least one monitor 24, which is operatively coupled to processor 22. During the operation of the avionics display system 20, the processor 22 drives the graphics module 27 which, in conjunction with processor 22, drives the monitor 24 to produce a graphics display 26 that visually provides the pilot and flight crew with information pertaining to the aircraft and to neighboring aircraft within a predetermined vicinity of the host aircraft. The processor 22 includes a speech recognizer 11 and may be used to provide the functions of the speech recognizer 11. The speech recognizer 11 may convert received speech transmissions to text as well as perform appending of text and concatenating of text messages with system messages. The speech recognizer 11 may perform natural language processing ("NLP") of received audio or voice transmission as well as monitoring of broadcasts and transmissions for conversion to text and further processing by the processor 22. The speech recognizer 11 may perform or assist the processor 22 in performing functions related to contextual interpretations and aggregations of the received broadcasted and transmitted voice transmissions. These transmissions may include transmissions as well as broadcasts from the ATC and aeronautical operation control ("AOC") to the aircraft or other aircrafts. The graphics display 26 may include visual representations of one or more flight characteristics pertaining to a neighboring aircraft, as described more fully below. The processor 22 may generate a graphics display 26 in a two-dimensional format (e.g., as a lateral or vertical profile map display) or in a hybrid format (e.g., in a picture-in-picture or split screen arrangement) and may be incorporated into all units capable of displaying TCAS data; e.g. the primary flight display, the multi-function display, and the interactive navigation display. The processor 22 may generate aural and audio messages to an audio output device 40 that provides the pilot and flight crew with information pertaining to the aircraft and to neighboring aircraft within a predetermined vicinity of the host aircraft. An audio capture device 42 may also be included connected into the processor 22. This audio capture device 42 may capture aural alerts from other systems of the aircraft or from pilot communications for processing by the processor 22.

The processor 22 may include, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below, for example, processor 22 may be included within a Flight Management Computer (FMC) of the type commonly deployed within a Flight Management System (FMS). The processor 22 may carry out functions associated with parsing, transcribing, aggregating and appending aural and text messages received by various inputs to the aircraft or from internal systems of the aircraft. The processor 22 with the speech recognizer 11 may include applications and solutions to perform natural language processing (NLP) of inputs of aural alerts to convert the aural alerts to text alerts. The conversion may include aural alerts consistent in structure with the message alert for aggregating together with the message alert to form a concatenated message alert type. The NLP may be applied with context based attributes based on applications of the processor 22 with the speech recognizer 11 to determine a context of the aural alert by matching with a set of context attributes prior derived for the particular aircraft and stored locally in memory of the processor 22 or memory 55.

The image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). The monitor 24 may be disposed at various locations throughout the cockpit. For example, the monitor 24 may include a primary flight display (PFD) and reside at a central location within the pilot's primary field-of-view. Alternatively, the monitor 24 may include a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 24 may be worn by one or more members of the flight crew.

The processor 22 includes one or more inputs operatively coupled to one or more air traffic data sources. During operation of the avionics display system 20, the air traffic data sources continually provide the processor 22 with navigational data pertaining to any neighboring aircraft. In the exemplary embodiment illustrated in FIG. 1, the air traffic data sources include a wireless transceiver 28 and a navigation system 30, which are operatively coupled to first and second inputs of processor 22, respectively.

The navigation system 30 includes an on-board radar 32 and various other on-board instrumentation 34 such as a radio altimeter, a barometric altimeter, a global positioning system (GPS) unit, and the like. In a preferred embodiment, navigation system 30 may be included within a FMS; and on-board radar 32 may be included within a Terrain Awareness and Warning System (TAWS), such as an Enhanced Ground Proximity Warning System (EGPWS).

In some embodiments, graphic displays 26 may provide an output from the on-board radar 32 of the aircraft. For example, graphic displays 26 may provide a top-down view, a horizontal view, or any other view of a weather condition, an object and/or a particular terrain detected by the on-board radar 32 of the aircraft. The views of a weather condition may include monochrome or color graphical representations of the weather. A graphical representation of a weather condition may include an indication of altitude (or altitudinal coordinates) of those objects or the altitude relative to the aircraft.

The avionics display system 20 provides the display information to the pilot or flight crew in a highly intuitive manner. For this exemplary embodiment, the avionics display system 20 includes the processor 22 connected to a database 14, a flight management system 16, a navigation system 30, a graphics module 27, and a graphics display 26. Further, it is contemplated that while the avionics display system 20 appears in FIG. 1 to be arranged as an integrated system, the present disclosure is not intended to be so limited and may also include an arrangement whereby one or more of processor(s) 22, database 14, flight management system 16, navigation system 30, graphics module 27, and graphics display 26 is a separate component or a subcomponent of another system located either onboard or external to an aircraft.

Also, for example, avionics display system 20 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and may also be implemented for other types of vehicles' electronic displays (such as, for example, spacecraft navigation displays, ship navigation displays, submarine navigation displays, train navigation displays, motor vehicle navigation displays, etc.).

The database 14 may also include, for example, a terrain database, which may include the locations and elevations of natural terrain obstacles such as mountains or other elevated ground areas, and also the locations and elevations of man-made obstacles such as radio antenna towers, buildings, bridges, etc. As another example, airport and runway location data, and other types of high priority target data (e.g., locations of incoming traffic to avoid, constructed waypoints, obstacles in the aircraft's flight path, etc.) may be retrieved and/or received by processer 22 from a suitable source of such data, such as, for example, an onboard flight management system database (e.g., a component of flight management system 16), an onboard navigation database (e.g., a component of navigation system 30), on-board sensors 36 or the on-board radar 32, or an external database (e.g., via a data communication up-link).

The aircraft may be any aviation vehicle that uses a flight management system 16 as a primary user interface for flight crew interaction with the avionics display system 20 onboard the aircraft. The aircraft may be implemented as an airplane, helicopter, spacecraft, hovercraft, or the like. The one or more avionics systems may include a Flight Management System (FMS), aircraft interface device (AID) or the like. Data obtained from the one or more avionics systems may include, without limitation: flight plan data, aircraft state data, weather data, brake system data, fuel and weights data, runway analysis data, aircraft performance data, or the like.

The memory 55 can be external to and operatively coupled to processing unit or, instead, in integrated into processer 22. In one embodiment, a processor and memory of the processer 22 reside in an Application Specific Integrated Circuit ("ASIC"). Memory 55 may store data, such as various software or firmware, supporting operation of processer 22 and other components included in avionics display system 20, such as graphics system, sensor system, and the source of aircraft state data. Additionally, the memory 55 may store one or more onboard databases or be connected to the database 14. Onboard the aircraft, the database 14 can include a navigational database, a terrain database, a weather database, a historical trend database, and/or a runway database, such as an Enhanced Ground Proximity Warning System ("EGPWS") runway database.

The processer 22 and a graphics module 27 cooperate to display, render, or otherwise convey one or more graphical representations, synthetic displays, graphical icons, visual symbology, or images associated with operation of avionics display system 20 on graphics display 26. An embodiment of an avionics display system 20 may utilize existing graphics processing techniques and technologies in conjunction with graphics module 27. Graphics module 27 is suitably configured to support well-known graphics technologies and display techniques including (i) synthetic vision, (ii) enhanced vision, (iii) combined vision, and (iv) compressed attitude.

Graphics display 26 may include any image-generating device or devices capable of producing one or more navigation displays of the types described herein. As a point of emphasis, the term "display device" encompasses display devices (image-generating devices) fixed to the aircraft (A/C) cockpit, as well as Electronic Flight Bags ("EFBs") and other portable display devices that may be carried by a pilot into the cockpit of an A/C and perform the below-described functions. For example, the graphics display 26 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display may be implemented with multiple types of graphics display 26, each of which may implement one or more of these different, non-limiting displays. No matter the number or particular type of display that is used to implement the graphics display 26, it was noted above that the graphics display 26 is responsive to the image rendering display commands it receives to render various images. The images that the graphics display 26 renders will depend, for example, on the type of display being implemented.

The graphics display 26 may also consider input data received via user input device 21 when performing the above-described functions. In this regard, user input device can include any number and type of input devices suitable for receiving pilot input, which may be distributed throughout the cockpit of an aircraft (A/C) and possibly included in other systems or subsystems. In one embodiment, user input interface assumes the form of or includes the alphanumeric keypad of an FMS.

The processer 22 is configured, upon receipt of data and information, to continuously process the information to identify the predictive tracking angle, roll, pitch, and yaw for the aircraft A/C, and to generate a symbolic form representative thereof. The symbolic form is an aircraft orientation cue to be displayed on the graphics display 26, and the dimensions of the symbolic form vary predictably to indicate, respectively, predictive tracking angle, roll, and yaw.

Within other on-board instrumentation 34, each sensor may include one or more sensor technologies, devices, instruments (such as on-board radar, radar altimeter, a global positioning system (GPS)), and software, sufficient for detecting and providing aircraft A/C status data (including speed, location, position, remaining fuel, faults, conditions, and detected weather and temperature).

Figure 2:
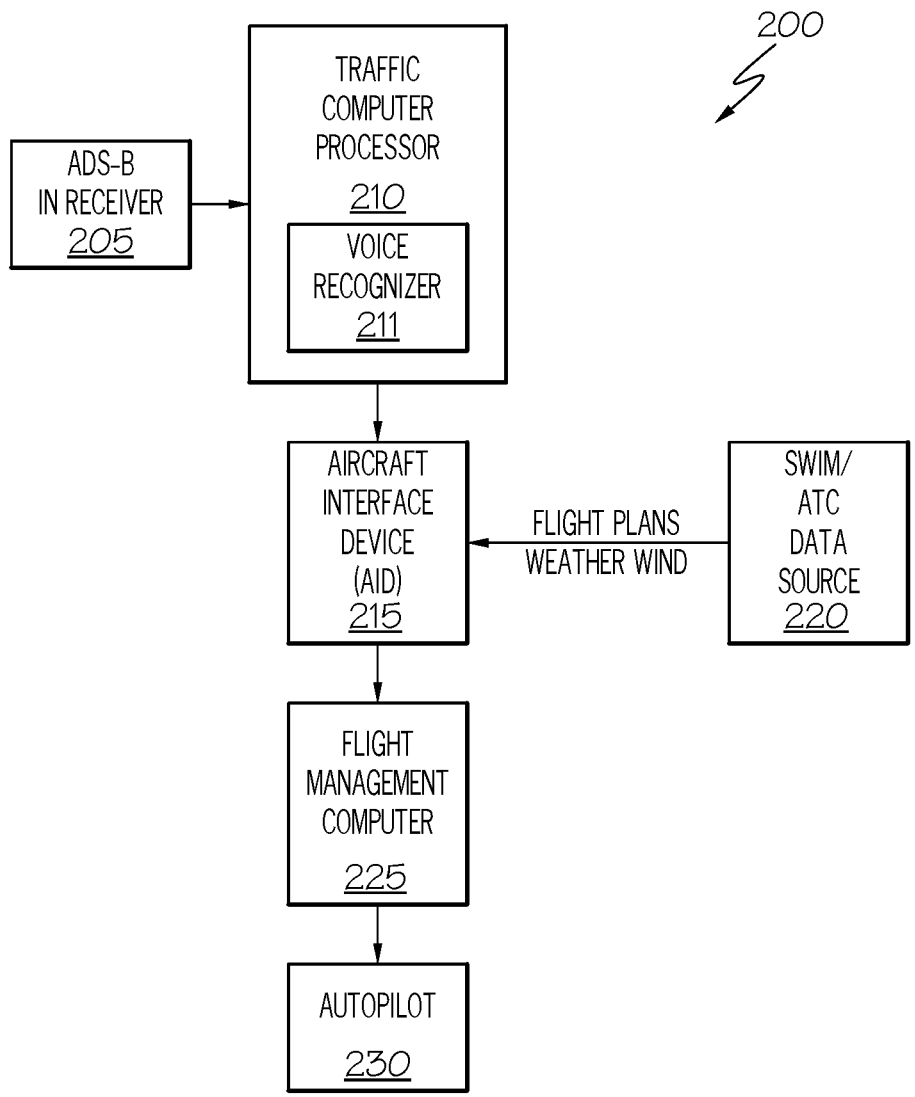
FIG. 2 is a block diagram of a system suitable for use in an aircraft in accordance with the exemplary embodiments described herein.

FIG. 2 depicts a block diagram of an exemplary aircraft navigation and control system for use with speech recognition, in accordance with the disclosed embodiments. FIG. 2 includes an automatic dependent surveillance broadcast (ADS-B) receiver 205 which is an integral component of NextGen national airspace strategy were the aircraft receives flight information services-broadcast (FIS-B) and traffic information services broadcast (TIS-B) data and other ADS-B data such as direct communication from nearby aircrafts at a traffic computer 210. The traffic computer 210 receives the ADS-B in and generates the target aircraft state parameters to an aircraft interface device (AID) 215. The traffic computer 210 may also include processors of a voice recognizer 211 for speech recognition and may provide voice recognize functions to convert voice transmissions to text. In addition, the voice recognizer 211 may include solutions for semantic contextual interpretations of the voice transmissions and for appending and aggregating to other text messages or flight data. For example, functions and solutions of the voice recognizer 211 together with functions and solutions of the traffic computer 210 may be used to match aural and text messages, concatenate aural and text messages, and append or aggregate in similar or same structures pairs of aural transformed messages with text messages. Also, the AID 215 receives the flight data, weather, wind as well as inputs received from a System Wide Information Management/Air Traffic Control (SWIM/ATC) data source 220. The aircraft interface device (AID) 215 is coupled to the FMC 225 and sends speed data to the autopilot 230.

The ADS-B receiver 205 is considered an air traffic data source in that ADS-B receiver 205 receives navigational data from external control sources and relays this data to traffic computer 210. For example, ADS-B receiver 205 may receive Traffic Information Services-Broadcast (TIS-B) data from external control sources. In a preferred embodiment, the ADS-B receiver 205 receives Traffic Collision Avoidance System (TCAS) data, and may receive Automatic Dependent Surveillance-Broadcast (ADS-B) data from neighboring aircraft. This data, and other such external source data, is formatted to include air traffic information, which may be utilized to determine a neighboring aircraft's current position and the existence and location of air traffic.

In addition, the TCAS is an airborne system that detects and tracks aircraft near a host aircraft. TCAS includes a processor, antennas, a traffic display (e.g. an LMAP display, a VSD, etc.), and means for controlling the aviation display system, such as is shown in FIG. 1. The processor and antennas detect and track other aircraft by interrogating their transponders, and tracking these potential intruders on a display. The TCAS processor analyzes the transponder replies to determined range, bearing and relative altitude. If the system determines that a potential hazard exists, it issues visual and aural advisories to the crew. The visual advisory takes the form of symbols on the one or more traffic displays; e.g. the LMAP display and VSD.

Also, it is contemplated that in an Internet of Things environment many of the participating systems may be connected to each other and additional systems connected or interconnected could be easily added or removed.

Figure 3:
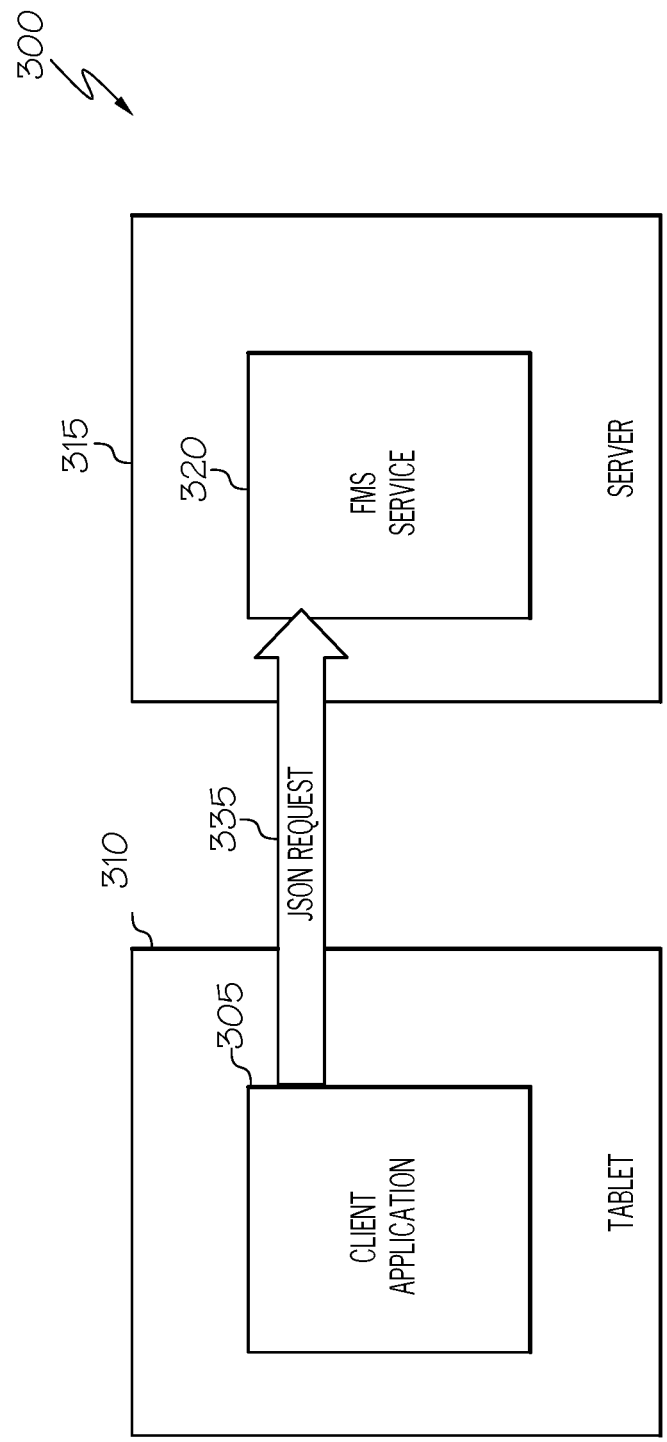
FIG. 3 is a diagram of the connected FMS of an exemplary method suitable for use with the system of FIGS. 1-2 in accordance with the exemplary embodiments.

FIG. 3 illustrates a system in accordance with an exemplary embodiment. JSON (JavaScript Object Notation) is a lightweight data interchange format for gathering, collecting, or share data among applications and interfaces. JSON provides data to its corresponding calling function in key value pairs, 'key' as in the variable and 'value' as in the corresponding value for the variable. The data that is parsed from a JSON API is in the form of objects that need to be converted into their respective data formats as acceptable by the system. REST (Representational State Transfer) is an architectural style and is an approach to communications between different modules often used in the development of web services.

In RESTful systems, requests and responses are built around the transfer of representations of resources such as in this instance data sets, which capture a current or intended state of the underlying resource. RESTful components perform actions on a resource by using a representation to capture the current or intended state of that resource, and transferring that representation between components.

To create a RESTful API, the user executes a customized application provided by the developer, in this case the connected FMS service, and defines the RESTful API by configuring a backend database for in this instance, the data set for the connected FMS. In instances, the data set for the connected FMS may be used or synced to the data set of the embedded FMS. The developer of the connected FMS may define objects that may be requested through the RESTful API and these objects may relate or map to datasets of a database associated with the connected FMS service. In addition, the developer of the connected FMS may configure what access to these objects is allowed to the client applications.

The client application sends one or more RESTful API requests (i.e., HTTP messages) to an API generator to create an object and afterwards send RESTful API requests to use the object. In the connected FMS the requests could be retrieve the data sets of the objects, add to the data sets or use the data sets for further processing and modeling.

The flight management system 300 includes a mobile device 310 hosting a client application 305 which sends a "JSON" request to the server device 315 to the FMS service application 320 hosted on the server. Thus, for example, the client device 305 may transmit RESTful API requests to the server device 315 executing an object for the dataset or a defined resource. In turn, the server device 315 may then transmit and receive messages from the FMS service 320 which hosts a database (e.g., to create a database table for a created object). Although the communications between the FMS service application 320 and the server device 315 are illustrated herein as passing through a communication link 335; it is contemplated that the JSON request may be made by any number of client applications residing on different client devices. In an exemplary embodiment, the client application 305 would be a downloaded app or in-app that is configurable by the user and is agnostic to the operating system on the mobile device 310. The client application 305 sends the request to the JSON API with all the data of the response documents in the header i.e. the response document in this instance is a template or object storing the data set for use with the connected FMS. The server device 315 will respond with an "acceptable status" to the request. In an exemplary example, request may include the JSON API requests or may include a link to the object of the data set.

Additionally, The mobile device 310 which includes the client application 305 may use a mobile software development kit "SDK" platform. This SDK platform can provide one step activation of an on-demand service via in app of the client application 305 for activating an on-demand service such as the connected FMS. The mobile device 310 may include any mobile or connected computing device including "wearable mobile devices" having an operating system capable of running mobile applications or apps individually or in conjunction with other mobile or connected devices. Examples of "wearable mobile devices" include GOOGLE® GLASS™ and ANDROID® watches. Typically, the mobile device will have capabilities such as a display screen, a microphone, speakers and may have associated keyboard functionalities or even a touchscreen providing a virtual keyboard as well as buttons or icons on a display screen. Many such devices can connect to the internet and interconnect with other devices via Wi-Fi, Bluetooth or other near field communication (NFC) protocols.

Figure 4:
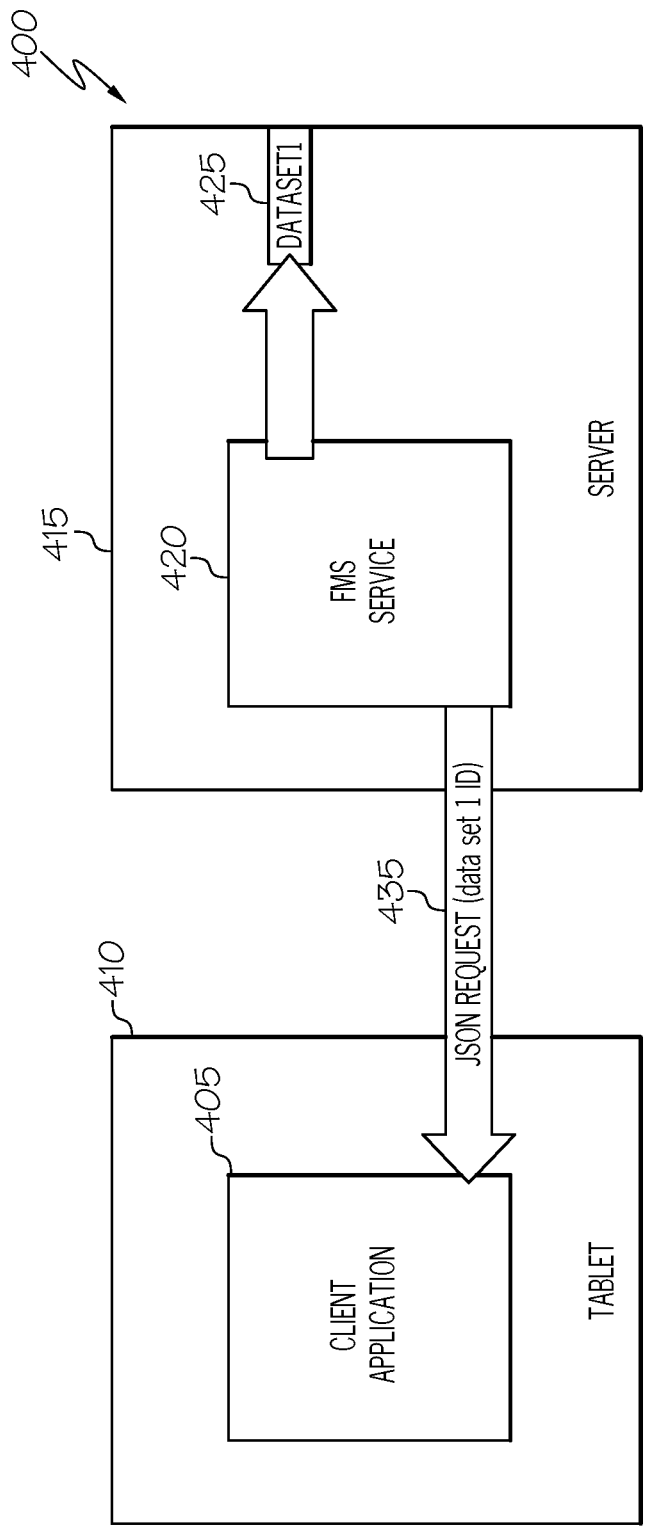
FIG. 4 is a diagram of the connected FMS of an exemplary method suitable for use with the system of FIGS. 1-2 in accordance with the exemplary embodiments.

FIG. 4 illustrates the JSON response to the request of the data set identifier. The connected FMS service 400 includes the client application 405, the mobile device 410, the JSON response 435, the FMS service 420 connected to the dataset1 425 hosted by the server 415. The JSON response 435 includes the resource identifier object which is the dataset1 425. The dataset1 can be considered the primary data and may be a single resource object. In an alternate embodiment, multiple datasets may be represented as an array. The resource object in the JSON API includes a type and ID. Here the type and ID are "dataset" and "1ID". Within a given API, each resource object's type and id pair identifies a single, unique resource which in this instance is the dataset 1 ID of the dataset1 425. The FMS service 420 executes the request, saves the Dataset 1 state, sends the response back to the client application 405 and the JSON response 435 includes the dataset 1.

In an exemplary embodiment, a sample script of a JSON API for generating the dataset1 425 is as follows:

```
SAMPLE API for Dataset 1
{
  "API_VERSION": "v.X.0.0",
  "Response": {
    "TRANSACTION_ID": 234545454,
    "AIRCRAFT_PROFILE_DATA": {
      "NAV_DATABASE_CYCLE":
      "2015-02-05T00:00:00Z/2015-03-05T00:00:00Z",
      "MAX_RESERVE_FUEL": {
        "VALUE": "1000",
        "UNITS": "LBS"
      },
      "MIN_RESERVE_FUEL": {
        "VALUE": "0",
        "UNITS": "LBS"
      },
      "MAX_FUEL_WEIGHT": {
        "VALUE": "60000",
        "UNITS": "LBS"
      },
      "MIN_FUEL_WEIGHT": {
        "VALUE": "0",
        "UNITS": "LBS"
      },
      "MAX_ZERO_FUEL_WEIGHT": {
        "VALUE": "120000",
        "UNITS": "LBS"
      },
      "MIN_ZERO_FUEL_WEIGHT": {
        "VALUE": "1000",
        "UNITS": "LBS"
      },
      "MAX_GROSS_WEIGHT": {
        "VALUE": "90000",
        "UNITS": "LBS"
      },
      "MIN_GROSS_WEIGHT": {
        "VALUE": "1000",
        "UNITS": "LBS"
      },
      "BASIC_OPERATING_WEIGHT": {
        "VALUE": "6000",
        "UNITS": "LBS"
      }
    },
    "FLIGHT_PLAN": {
```

-continued

```
"FLIGHT_NUMBER": "",
"RECALL_ID": "Dataset 1",
"PERFORMANCE_INITIALIZATION_DATA": {
    "PAYLOAD": {
        "VALUE": "16000",
        "UNITS": "LBS"
    },
    "FUEL_WEIGHT": {
        "VALUE": "1500",
        "UNITS": "LBS"
    }
},
"FPLN_SEGMENTS": [
    {
        "ACTIVE": "FALSE",
        "ROUTE_DEFINITION": {
            "COMPANY_ROUTE": "",
            "ROUTE_STRING": "NONE",
            "ORIGIN_AIRPORT": {
                "ORIGIN": {
                    "CATEGORY": "DEFINED_AIRPORT"
                    "IDENT": "KSFO",
                    "POSITION": {
                        "LATITUDE": "37.61881828",
                        "LONGITUDE": "-122.3754215"
                    },
                    "FIELD_ELEVATION": {
                        "VALUE": "10",
                        "UNITS": "FEET",
                        "ALT_TYPE": "MSL"
                    },
                    "RUNWAY_LIST": [
                        {
                            "IDENT": "RWY01L",
                            "LENGTH": {
                                "VALUE": "1.259028077",
                                "UNITS": "NM"
                            },
                            "BEARING": {
                                "VALUE": {
                                    "VALUE": "13.79902032",
                                    "ANGLE_TYPE": "NORM"
                                }
```

In appendix A, the JSON API includes the "TRANSACTION_ID": 234545454" for identifying a particular JSON request; the particular aircraft by the "AIRCRAFT_PROFILE_DATA". This profile data includes aircraft attributes as follows: "NAV_DATABASE_CYCLE": "2015-02-05T00:00:00Z/2015-03-05T00:00:00Z","MAX_RESERVE_FUEL" "MIN_RESERVE_FUEL": "MAX_FUEL_WEIGHT etc. In other words, the JSON API generates data necessary for a particular flight path and the script stores the data in the dataset, in this instance, the dataset1.

Figure 5:
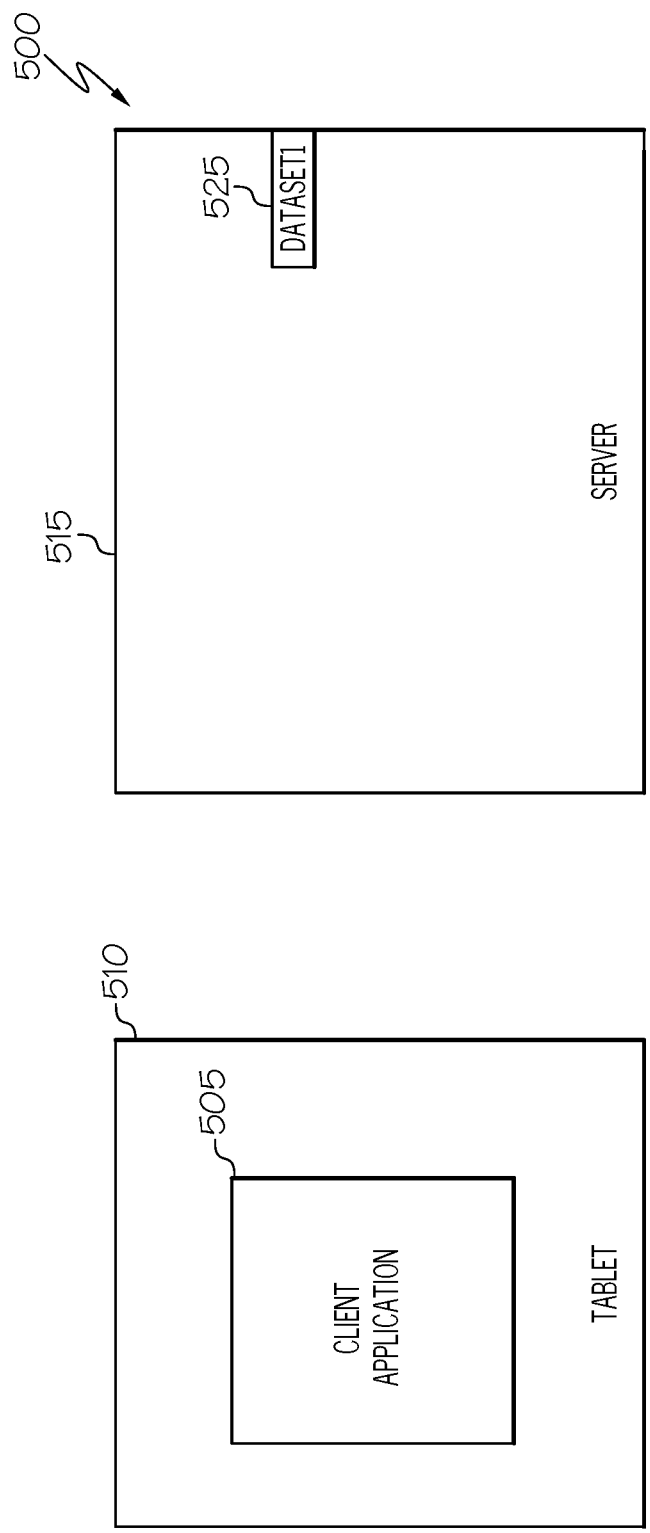
FIG. 5 is a diagram of the connected FMS of an exemplary method suitable for use with the system of FIGS. 1-2 in accordance with the exemplary embodiments.

FIG. 5 illustrates the retention of the dataset 1 in the FMS service after the connected FMS session has been completed. In an exemplary embodiment, the dataset 1 525 residing at the server 515 or a database (not shown) associated with the server may designated as unique to the particular request made by the client application 505 hosted on the mobile device 510. For example, if the client application 505 requests the connected FMS service compute a flight plan and compute a time and a gross weight at the destination for a particular aircraft, the dataset is unique for that request for the particular aircraft. In another instance, the client application 505 could then request a change to the previous flight plan or gross weight data upon which the connected FMS service has already processed by the client application 505 only having to send a request with the dataset id and the changed data as part of a subsequent request or at the least populate the data set of the subsequent request with some similar data from the original data set. For example, if the dataset is deemed to be aircraft specific, in such instances, only a limited subset of the original data of the data set may be of value. However, in such instances, the client application 505 may still allow for retrieval and pre-populating of the limited subset of data for convenience.

Figure 6:
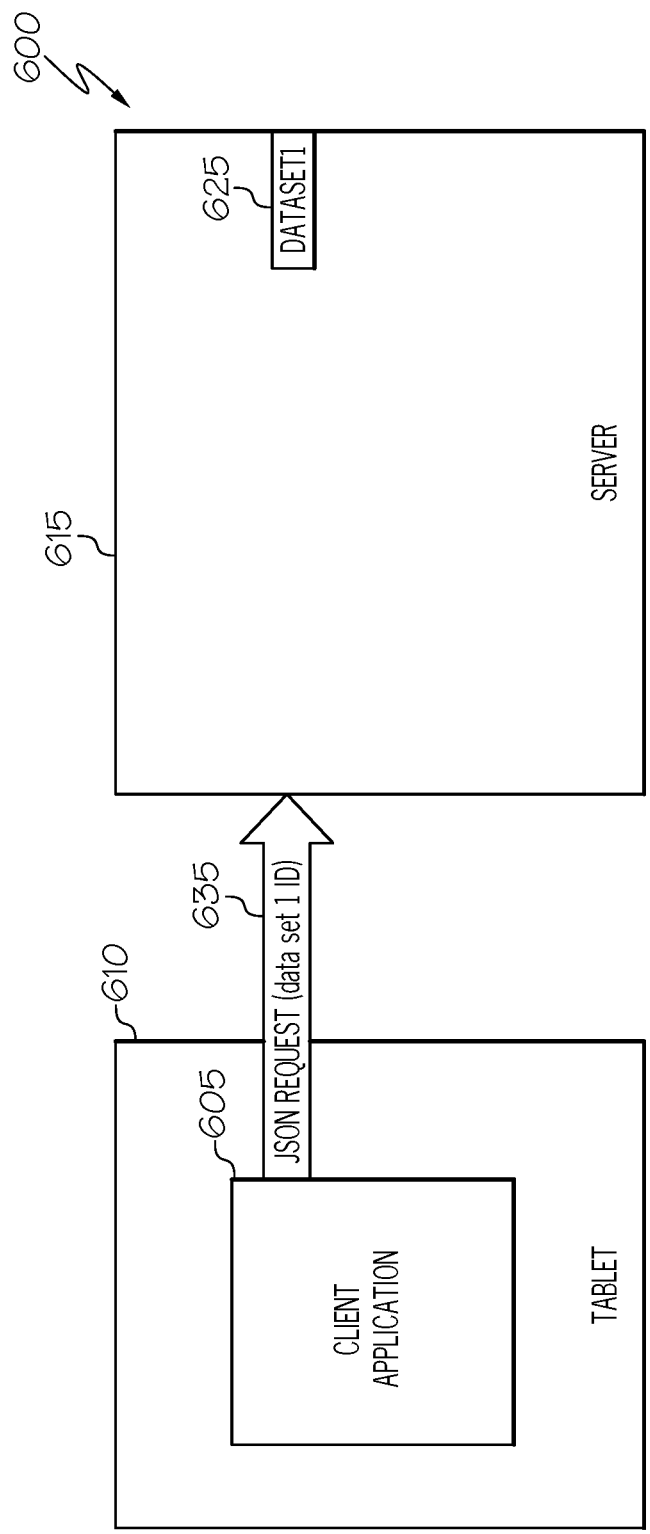
FIG. 6 is a diagram of the connected FMS of an exemplary method suitable for use with the system of FIGS. 1-2 in accordance with the exemplary embodiments.

FIG. 6 illustrates a connected FMS 600 with a JSON request 635 from the client application 605 residing on the client device 610 including the object of the dataset1 ID 625 to initialize the connected FMS service of the server 615 for a given state and in addition provisioning of any additional modification inputted by the user. For example, the user may want to model particular modifications to the dataset and execute the flight plan with the modeled data. In addition, the user may desire certain operational achievements, like achieving a particular waypoint or fuel consumption efficiency. The resource object of the dataset1 625 with the JSON request 635 may or may not have all the attributes in the original object of the dataset1 625. In such instances, the server 615 may include the current attributes for missing attributes, hence the JSON request 635 may not be a complete request and include missing elements. The connected FMS service would still using the elements of the original resource object of the dataset1 625 be able to complete the request.

Figure 7:
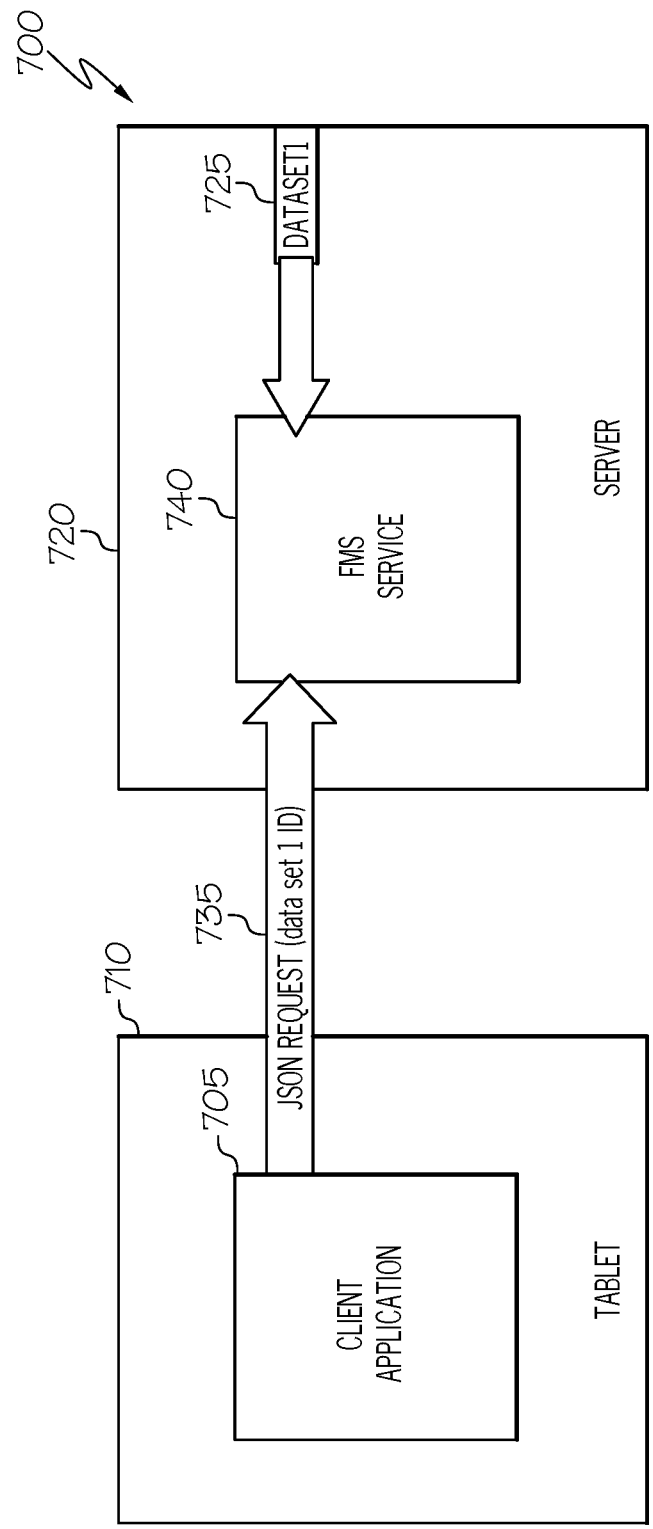
FIG. 7 is a diagram of the connected FMS of an exemplary method suitable for use with the system of FIGS. 1-2 in accordance with the exemplary embodiments.

In FIG. 7, the connected FMS service 700 includes the FMS service 740 hosted by the server 720 connected to the resource object of the dataset1 725 and receives the JSON request 735 with the updated resource of the dataset1 from the client application 705 residing on the mobile device 710. The FMS service 740 which is generated on the server 720 using the JSON API, the JSON request 735 is sent to the FMS service 740 using the initial conditions which provisions the state of the connected FMS.

Figure 8:
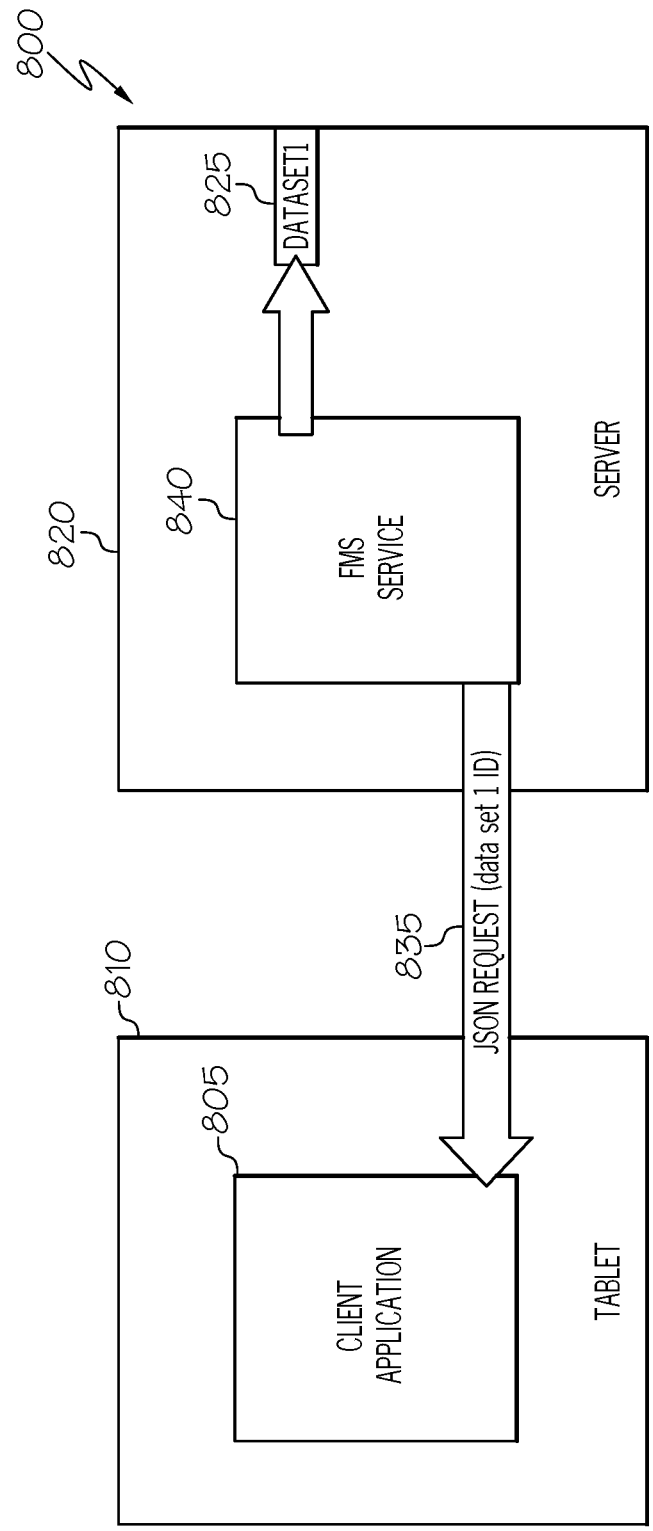
FIG. 8 is a diagram of the connected FMS of an exemplary method suitable for use with the system of FIGS. 1-2 in accordance with the exemplary embodiments.

In FIG. 8, the connected FMS 800 includes the FMS service 840 hosted by the server 820 connected to the resource object of the dataset1 825 and sends the JSON response 835 with the updated resource of the dataset1 to the client application 805 residing on the mobile device 810. The FMS service 840 executes the JSON request, updates the resource object of the dataset1 825 and send the JSON response 835 back to the client application 805. The JSON response 835 sent back includes the dataset 1 ID so the client application 805 can access the dataset1 with the updates.

Figure 9:
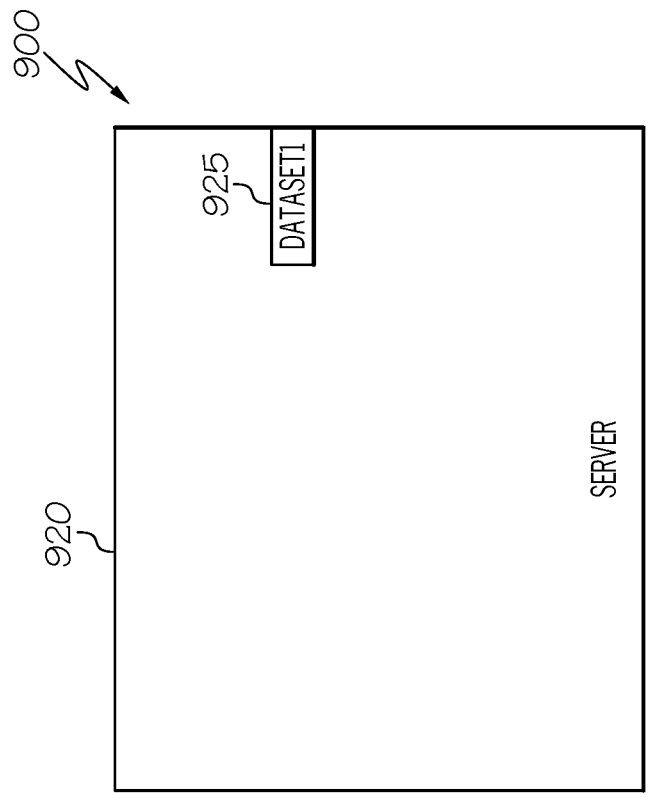
FIG. 9 is a diagram of the connected FMS of an exemplary method suitable for use with the system of FIGS. 1-2 in accordance with the exemplary embodiments.
Figure 9:
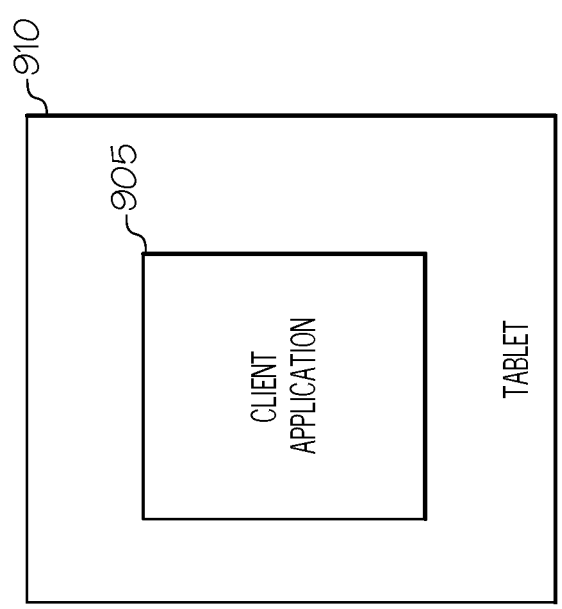

In FIG. 9 the connected FMS 900 includes the dataset1 925 residing on the server 920 which is not in communication with the mobile device 910 or client application 905 residing on the mobile device 910. In this instance, the object resource of the dataset1 925 resides at the server 920 until requested. Further, the resource object of the dataset1 925 may be made available to other client applications and for other users to access, modify or update depending on the privileges granted.

Figure 10:
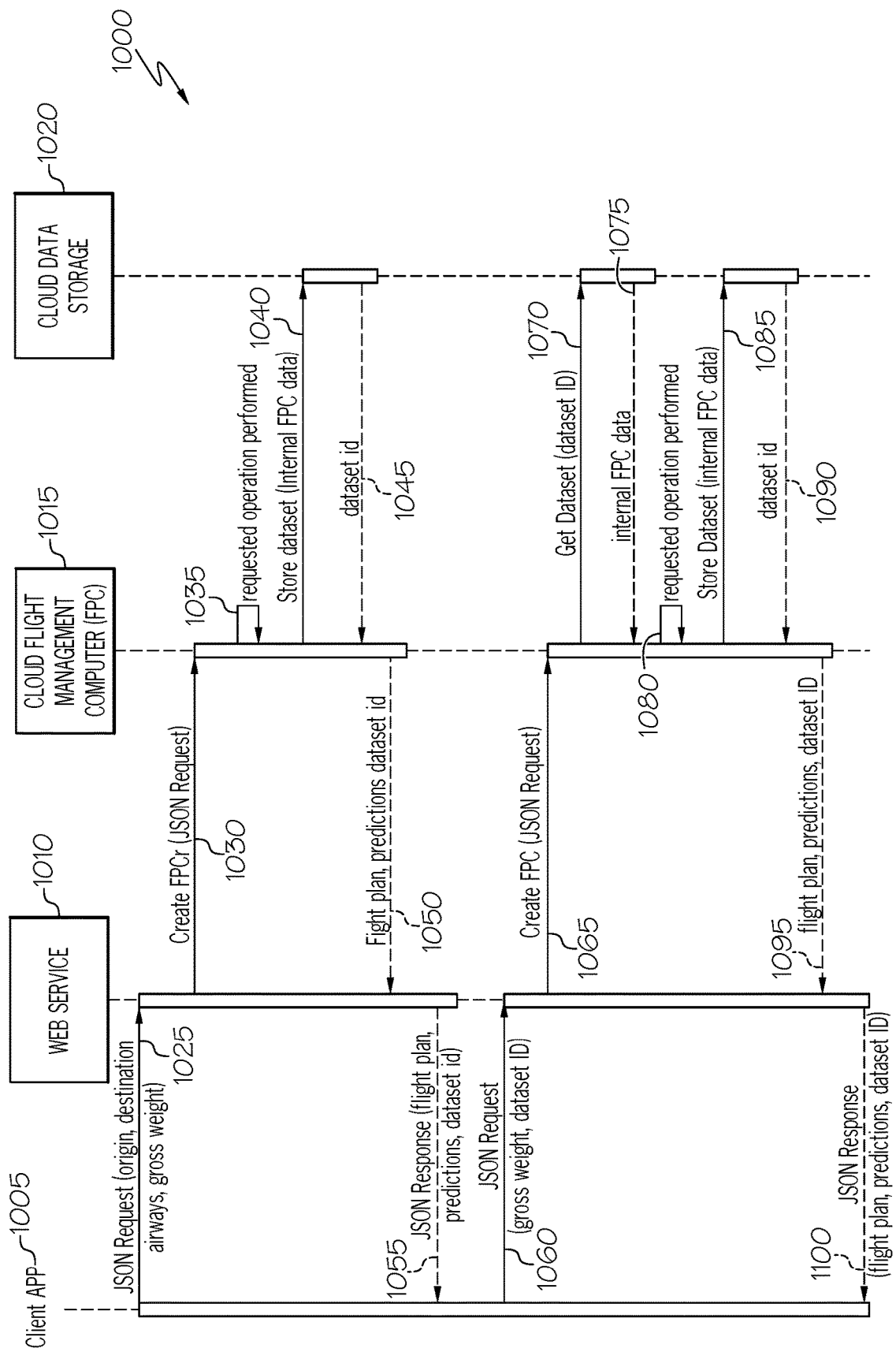
FIG. 10 is a process diagram of the connected FMS in accordance with exemplary embodiments described herein.

FIG. 10 illustrates a flow diagram for the connected FMS 1000 and includes the client application 1005, the web service 1010, the cloud flight management computer (FPC) 1015 and the cloud data storage 1020. The client application 1005 sends a JSON request 1025 to the web service 1010, the JSON request 1025 may include flight plan attributes of the origin of the particular flight, the destination, the airway to take, the gross weight of the aircraft etc. The FPC 1015 from the web service 1010 receives a create FPCr (JSON request) 1030 to create the flight plan. At 1035, the FPC 1015 executes the requested operation received. The FPC may need to access the cloud data storage 1020 with a fetch or access request at 1040 for the storedataset(internal FPC data). At 1045, the FPC 1015 receives the dataset id 1045 of link to the dataset from the cloud data storage 1020. At 1050, the attributes of the flight plan, predictions dataset id are set to the web service 1010. A JSON response 1055 to an initial JSON request 1025, is sent to the client application 1005. The JSON response includes attributes such as the flight plan, predictions, dataset id etc. These may be framed as one or more data structures or objects. The client application 1005 may then send another JSON request 1060 with updates or modifications or simply retrieval of the of the original dataset data. In any event the JSON request 1060 is sent from the client application 1005 to the web service 1010. A set of attributes may also be included in this JSON request 1060 of gross weight, dataset ID etc. This JSON request 1060 is sent to the web service 1010 which in turn sends a create FPC(JSON request) 1065 to the FPC 1015. The FPC 1015 in turn sends a getdataset(dataset ID) request 1070 to the cloud data storage 1020. The cloud data storage 1020 responds with the internal FPC data 1075. The requested operation at 1080 is executed by the FPC 1015. At 1085, the storedataset(internal FPC data) is sent to the cloud data storage 1020 for retention. In some instances, the internal FPC data may be synced with the original FPC data. At 1090, the dataset id is sent to the FPC 1015 from the cloud data storage and subsequently sent from the FPC 1015 with the attributes of for example of: a generated flight plan, predictions, and data set id at 1095 to the web service 1010. The web service 1010 sends a JSON response 1100 with this data to the client application 1005.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing a flight management service at a server in a cloud computing environment, the method comprising:

generating a JavaScript Object Notation (JSON) object request from a client application, the JSON object request comprising a data set of flight plan attributes to initialize a cloud management computer at the server for an initial given state;

receiving, at the cloud management computer at the server the JSON object request wherein the JSON object request enables a create cloud management computer JSON object request by the cloud management computer to create a flight plan by executing get data set requests to a cloud data storage wherein the cloud data storage responds with internal cloud management computer data and the internal cloud management computer data stored is synced with cloud management computer data at the cloud data storage for retention;

sending an initial JSON object response to the client application, the initial JSON object request comprising flight plan attribute data and subsequently updating a dataset at the cloud data storage and sending an updated JSON object response to the client application;

processing, by the flight management service hosted by the server, the JSON object request generating a JSON object response comprising a resource identifier and JSON object for a particular flight plan wherein the resource identifier and JSON object comprises: a data set of necessary data for the particular flight plan generated by a JSON API specifying how client object requests are fetched;

storing, by the flight management service, the data set comprising the necessary data for the particular flight plan and the resource identifier as a stateless object in the cloud environment; and sending, by the server, the JSON object response comprising the resource identifier from the flight management service to a mobile device, for accessing the necessary data set of the stateless object for the particular flight plan.

2. The method of claim 1, wherein the JSON object response comprises: at least a dataset id.

3. The method of claim 1, further comprising:
provisioning, by the server, a flight management computer of the flight management service with the attributes of the JSON object request.

4. The method of claim 1 wherein the mobile device further comprising:
receiving, by the server, the JSON object request from & the client application residing on the mobile device.

5. The method of claim 1 further comprising:
configuring the flight management service with an embedded flight management service residing locally at the mobile device.

6. A computer program product for a cloud-computing environment comprising a plurality of cloud-computing resources, the product comprising: a computer-readable storage medium in which program instructions are stored, the program instructions are configured to cause a cloud management computer of a flight management service at a server to perform the operations of:

generating a JavaScript Object Notation (JSON) object request from a client application, the JSON object request comprising a data set of flight plan attributes to initialize the cloud management computer at the server for an initial given state;

receiving, at the cloud management computer at the server the JSON object request by a server from a mobile device wherein the JSON object request enables a create cloud management computer JSON object request by the cloud management computer to create a flight plan by executing get data set requests to a cloud data storage wherein the cloud data storage responds with internal cloud management computer data and the internal cloud management computer data stored is synced with cloud management computer data at the cloud data storage for retention;

sending an initial JSON object response to the client application, the initial JSON object request comprising flight plan attribute data and subsequently updating a dataset at the cloud data storage and sending an updated JSON object response to the client application;

processing, by the flight management service hosted by the server, the JSON object request generating a JSON object response comprising a resource identifier and JSON object of necessary data for a particular flight plan generated by a JSON API specifying how client object requests are fetched for a particular flight plan wherein the resource identifier and JSON object comprises: a data set;

storing, by the flight management service, the data set comprising the necessary data for the particular flight plan and the resource identifier as a stateless object in the cloud environment; and sending, by the server, the JSON object response comprising the resource identifier from the flight management service to the mobile device, for accessing the necessary data set of the stateless object for the particular flight plan.

7. The method to perform the operations of claim 6, wherein the JSON object response comprises: at least a dataset id.

8. The method of claim 6 to perform the operations, further comprising:
provisioning, by the server, a flight management computer of the flight management service with the attributes of the JSON object request.

9. The method of claim 6 to perform the operations, further comprising:
configuring the flight management service with an embedded flight management service residing locally.

10. A non-transitory computer-readable medium storing a computer program product executable by a processor of a computer system in a cloud computing environment for processing an object request, the non-transitory computer-readable medium comprising:

code for generating a JavaScript Object Notation (JSON) object request from a client application, the JSON object request comprising a data set of flight plan attributes to initialize a cloud management computer at a server for an initial given state;

code for receiving, at the cloud management computer at the server the JSON object request wherein the JSON object request enables a create cloud management computer JSON object request by the cloud management computer to create a flight plan by executing get data set requests to a cloud data storage wherein the cloud data storage responds with internal cloud management computer data and the internal cloud management computer data stored is synced with cloud management computer data at the cloud data storage for retention;

code for sending an initial JSON object response to a client application comprising flight plan attribute data and subsequently updating the dataset at the cloud data storage and sending an updated JSON object response to the client application;

code for processing, by a flight management service hosted by the server, the JSON object request generating a JSON object response comprising a resource identifier and JSON object for a particular flight plan wherein the resource identifier and JSON object comprises: a data set of necessary data for the particular flight plan generated by a JSON API specifying how client object requests are fetched;

code for storing, by the flight management service, the data set comprising the necessary data for the particular flight plan and the resource identifier as a stateless object in the cloud environment; and code for sending, by the server, the JSON object response comprising the resource identifier from the flight management service to a mobile device, for accessing the necessary data set of the stateless object for the particular flight plan.

11. The non-transitory computer-readable medium of claim 10 wherein the JSON object response comprises: at least a dataset id.

12. The non-transitory computer-readable medium of claim 10, further comprising:

code for provisioning, by the server, a flight management computer of the flight management service with the attributes of the JSON object request.

13. The non-transitory computer-readable medium of claim 10 further comprising:

code for receiving, by the server, the JSON object request from a client application residing on the mobile device.

* * * * *

UNITED STATES PATENT AND TRADEMARK OFFICE
CERTIFICATE OF CORRECTION

PATENT NO.      : 10,797,945 B2
APPLICATION NO. : 15/884835
DATED           : October 6, 2020
INVENTOR(S)     : Phillip Toews et al.

Page 1 of 1

It is certified that error appears in the above-identified patent and that said Letters Patent is hereby corrected as shown below:

In the Claims

Column 17, Line 36, "comprising:" should be changed to --comprises:--;
Column 17, Line 37, "&" at the end of the line should be removed.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*